(12) United States Patent
Molsen

(10) Patent No.: US 6,429,983 B2
(45) Date of Patent: Aug. 6, 2002

(54) TRANSFLECTOR, AND A TRANSFLECTIVE DISPLAY DEVICE

(75) Inventor: Henning Molsen, Lueneburg (DE)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/903,399

(22) Filed: Jul. 11, 2001

(30) Foreign Application Priority Data

Jul. 14, 2000 (GB) .............................................. 0017294

(51) Int. Cl.⁷ .................................................. G02B 5/04
(52) U.S. Cl. ........................ 359/837; 359/838; 359/496; 359/497; 359/498

(58) Field of Search .................................. 359/837, 838, 359/831, 832, 496, 497, 498, 493

(56) References Cited

FOREIGN PATENT DOCUMENTS

EP          0 883 015 A1       9/1998

*Primary Examiner*—Mohammad Sikder
(74) *Attorney, Agent, or Firm*—Renner, Otto, Boisselle & Sklar

(57) ABSTRACT

This invention relates to a scattering transflector wherein the reflectivity of a surface of the transflector is dependent on the angle at which light is incident on the surface of the transflector. This invention also relates to a display device comprising an optical modulating element and the foregoing scattering transflector.

58 Claims, 7 Drawing Sheets

TRANSFLECTOR, AND A TRANSFLECTIVE DISPLAY DEVICE

BACKGROUND OF THE INVENTION

1. Field of the Invention

The present invention relates to a transflector. A transflector is an optical element that when illuminated with light from one direction will reflect a significant proportion of the incident light, and that when illuminated with light from another direction will transmit a significant proportion of the incident light. The present invention also relates to a transflective display device, in particular to a transflective electro-optical display device, for example such as a transflective liquid crystal display device.

2. Description of The Related Art

Reflective display devices are well known. The principle of a reflective display device is illustrated in FIG. 1. This shows a reflective display device that consists of a light-modulating element 4 and a reflector 6 disposed behind the light-modulating element 4. The light-modulating element is formed of a layer 1 of electro-optic material, for example such as a liquid crystal material, disposed between a front substrate 2 and a rear substrate 3. The front substrate 2 is transparent, but the rear substrate 3 need not be transparent. (The term "front" of the display device refers to the side of the display device that is intended to face a viewer when the display is in use.) The display device shown in FIG. 1 is intended to be illuminated from the front by ambient light. A representative source of ambient light 5 is shown in FIG. 1.

Light incident on the front of the light-modulating element 4 passes through the light-modulating element, is reflected by the reflector 6, and passes back through the light-modulating element to a viewer 7. (In practice, light from the light source 5 will undergo refraction as it passes through the optical modulating element, in particular at the front surface of the front substrate 2. This refraction is not shown in FIG. 1 for clarity of explanation.) The image seen by the viewer 7 can be changed by varying the voltage applied across the electro-optic layer. A reflective device has the advantage that, under suitable illumination conditions, it can utilise ambient light and does not require its own light source. As a result the power consumption of the display device is reduced, and this is advantageous for a battery-powered device.

For such a reflective display to operate effectively, it is necessary that sufficient of the ambient light incident on the display is directed towards the viewer so that a sufficiently bright display is produced. Blazed reflectors can be used to redirect ambient light impinging on a reflective display at an oblique angle so that, after reflection, it exits the display substantially at normal incidence. This is advantageous since viewers of a display generally view the display from the normal direction, or from a near-normal direction, and the use of a blazed reflector creates a higher reflectance of the display towards such a viewer.

Conventional reflective display devices are generally provided with a scattering reflector. A scattering reflector reflects incident light into a range of angles about the direction of specular reflection. This provides even illumination over the area of the display, and also prevents the viewer from seeing a reflected image of the ambient light source.

Co-pending UK patent application No 9909379.1 and corresponding Japanese patent application No 2000-123 267 disclose a scattering blazed reflector that eliminates diffraction effects.

EP 0 883 015 A1 discloses a scattering reflector for an LC display consisting of a reflector and a light diffusion layer disposed above the reflector. The scattering reflector is used to reflect ambient light back through the LC display. In this reflector, the entire surface of the scattering reflector is covered by a metallic reflective layer that is not transmissive.

In order to improve visibility of images, ambient light is selectively reflected from the scattering reflector into a direction, which is different from the direction of reflection of ambient light from front surfaces of the display. The reflected light intensity therefore depends on the angle under which the reflected light intensity is observed. In order to broaden the range of angles into which light is reflected, a light diffusion layer is provided on the reflector.

The magnitude of the overall reflectivity of this reflector, however, does not depend on the angle at which light is incident on the surface of the reflector.

in practice, the optical modulating element 4 of the display device of FIG. 1 will require other components to display an image, for example such as electrodes to allow the electro-optic layer 1 to be addressed: the optical modulating element may also comprise one or more polarising or retarding elements. These components have been omitted from FIG. 1 for clarity.

Reflective display devices have the disadvantage that they cannot operate in conditions of low ambient light, since insufficient light is reflected to form a satisfactory image. Where a display device is required to operate in conditions of low ambient light it is, therefore, necessary for the display device to be provided with an auxiliary light source that can illuminate the light-modulating element in conditions of low ambient light. The auxiliary light source can be disposed either in front of or behind the light-modulating element. A reflective display device in which the auxiliary light source is disposed in front of the light-modulating element is not relevant to the present invention, and will not be described further.

FIG. 2 illustrate the principle of operation of a reflective-type display device in which an auxiliary light source 9 is disposed on the opposite side of the light-modulating element 4 to the viewer 7. Since the auxiliary light source 9 is disposed behind the light-modulating element, it is generally known as a "back-light". Moreover, since the auxiliary light source 9 is disposed behind the light-modulating element, the rear substrate 3 is required to be transparent.

In place of the reflector 6 of the display device of FIG. 1, the display device of FIG. 2 is provided with a transflector 8 disposed behind the optical modulating element 4, between the optical modulating element 4 and the auxiliary light source 9. As noted above, a transflector is an optical element that when illuminated with light from one direction will reflect a significant proportion of the incident light, and that when illuminated with light from another direction will transmit a significant proportion of the incident light. (The terms "transmit" and "reflect" relate to the intended wavelength range of light with which the device will be used.) The display device of FIG. 2 is thus known as a transflective display device, since it contains a transflector.

FIG. 2 shows the operation of the transflective display device. When ambient light is incident on the optical modulating element 4, it passes through the optical modulating element and is reflected by the transflector a back to the viewer 7 (as is the case in FIG. 1, the effects of refraction have been ignored in FIG. 2). Thus, operation in ambient light is the same as for a reflective display device, and the back-light 9 does not need to be illuminated.

In conditions of low ambient light the back-light 9 is illuminated, and light from the back-light 9 passes through the transflector 8, through the optical modulating element 4, and reaches the viewer 7. In this mode of operation the transflector simply serves to transmit light, and it is preferable that the transflector has as great a transmissivity as possible to produce a bright image. In contrast, when the display device is illuminated by the ambient light source 5 the tranoflector 8 acts as a reflector, and it is desirable that the transflector reflects as much as possible of the light from the ambient light source 5 back to the viewer 7. Thus, in order to obtain a bright image in all lighting conditions, the transflector 8 should have a high reflectivity to light incident on its front face and a high transmissivity to light incident on its back face. In conventional transflectors, however, these two properties are in conflict with one another.

A transflective display device of the general type shown in FIG. 2 is generally provided with a scattering transflector. This is. to ensure that the optical modulating element is evenly illuminated over its entire display area, and to prevent the viewer from seeing an image of the ambient light source 5 or the back-light 9. A display device of the general type shown in FIG. 2 in which a scattering transflector is disposed behind a liquid crystal cell to disclosed in U.S. Pat. No. 4,106,859. It is also known to dispose the scattering. transflector inside the liquid crystal cell, rather than outside and behind the liquid crystal cell, and such a device is disclosed in U.S. Pat. No. 4,648,691.

One prior art scattering transflector is disclosed in U.S. Pat. No. 4,268,127 and U.S. Pat. No. 4,298,249. This prior art scattering transflector consists essentially of a continuous, partially-reflective, partially-transparent layer disposed over the entire surface of a transparent substrate. Such a scattering transflector is manufactured by, for example, disposing a thin metallic film onto a substrate that has an undulating upper surface. The thickness of the metallic film is chosen such that every point of the film has a non-zero reflectivity and a non-zero transmissivity. This prior art scattering transflector has the disadvantage that there is a "trade-off" between the reflectivity of the transflector and the transmissivity of the transflector. If the metallic film is made thicker the reflectivity is increased, but the transmissivity is reduced.

A second prior art scattering transflector is disclosed in U.S. Pat. No. 4,040,727. In this scattering transflector, a thick metallic layer is disposed over parts of a substrate that has an undulating surface Other parts of the surface of the substrate are not provided with the metallic film. The thickness of the metallic film is chosen so that it is nominally totally reflective (in practice, of course, some light will be absorbed by the film). The portions of the transflector where the metallic film is deposited are thus nominally totally reflective and non-transmissive. However, the portions where the metallic film is not disposed are nominally completely transmissive and non-reflective. This prior art scattering transflector again has the problem that there is a "trade-off" between the overall reflectivity and the overall transmissivity of the tranoflector. For example, if the area of the transflector that is covered by the metallic film is increased the overall reflectivity of the transflector is increased., but the overall transmissivity of the transflector is decreased.

SUMMARY OF THE INVENTION

A first aspect of the present invention provides scattering transflector wherein the reflectivity or the magnitude of the overall reflectivity of a surface of the transflector is dependent on the angle at which light is incident on the surface of the transflector. It is thus possible for the transflector to have a high reflectivity for light incident on the transflector from one direction, for example an oblique direction, while having a high transmissivity for light incident in another direction, for example a direction generally perpendicular to the transflector.

A second aspect of the present invention provides a scattering transflector comprising portions of reflective material and transmissive portions, wherein the ratio between the reflective area and the transmissive area is dependent on the direction of incidence of light onto the :transflector. Accordingly, depending on the angle of incidence of light onto the surface of the transflector. not the entire apparent surface of the transflector is covered by reflective material. It is thus possible to obtain a high reflectivity for light incident on the transflector from one direction, for example an oblique direction, while having a high transmissivity for light incident in another direction, for example a direction generally perpendicular to the transflector The transflector may comprise: a substrate having an undulating surface, a plurality of first portions of the undulating surface being inclined in a first direction and a plurality of second portions of the undulating surface being inclined in a second direction different from the first direction; and a reflective material disposed over selected parts of the undulating surface of the substrate; wherein the reflective material is disposed over a greater area of first portions of the undulating surface than second portions of the undulating surface. The apparent proportion of the area of the transflector that is coated with the reflective material will vary depending on the angle from which the transflector is viewed from, and will appear to be greatest when the transflector is viewed from a direction that is perpendicular to the first portions of the surface. Because the apparent proportion of the transflector that is covered with the reflective layer varies with angle, it is possible for a transflector of the present invention to have a greater reflectivity and a greater transmissivity than a conventional transflector, provided that the transflector is used such that the illumination angle when it to used in a reflective mode is different from the illumination angle when it is used in a transmissive mode. This can be done by, for example, illuminating the display device in an off-axis direction in the reflective mode and illuminating the display device in a substantially on-axis direction in the transmissive mode.

In a transflector of the invention light is transmitted through portions of the transflector where the reflective material is not provided, so there is no need for light to be transmitted through the reflective material. The reflective material can therefore be made as highly reflective as possible.

Moreover, in a prior art transflector of the type in which a continuous part-reflective, part-transmissive layer is disposed over the entire surface of the substrate there will be an absorption loss when the transflector is operated in a transmissive mode, since some light will inevitably be absorbed by the part-reflective, part-transmissive layer. Such an absorption loss does not occur in a transflector of the present invention, since light is transmitted through portions of the transflector where the reflective material is not provided.

The reflective material may be disposed over substantially all the first portions of the undulating surface of the substrate, and it may be disposed over all the first portions of the undulating surface of the substrate. The reflective material may be disposed over substantially none of the second portions of the undulating surface of the substrate, and it may be disposed over none of the second portions of the undulating surface of the substrate. Thus, preferably not all portions of the substrate are covered by the reflective material.

The average angle of inclination of each first portion of the undulating surface of the substrate may be equal in magnitude and opposite in sign to the average angle of inclination of each second portion of the undulating surface of the substrate. This provides a symmetric scattering reflector. Alternatively, the average angle of inclination of each first portion of the undulating surface of the substrate may be different in magnitude and opposite in sign to the average angle of inclination of each second portion of the undulating surface of the substrate. This provides an asymmetric scattering reflector.

The reflective material may be a metallic material.

The substrate of the transflector may be a polymeric substrate, or it may be d glass substrate.

Two or more of the portions of the reflective material may be electrically connected to one another. The transflector may further comprise a transparent, electrically conductive layer disposed over the undulating surface of the substrate. The portions of reflective material may be disposed over the transparent, electrically conductive layer. The two or more of the portions of the reflective material layer may be electrically connected to one another by the transparent, electrically conductive layer.

A portion of the substrate may have a thickness of substantially zero.

A third aspect of the present invention provides a display device comprising: an optical modulating element and a scattering transflector.

The transflector may be disposed relative to the optical modulating element such that angle between the normal to each first portion and the direction in which light is incident on the display surface of the display device is less than the angle between the normal to the display surface of the display device and the direction in which light is incident on the display surface.

The transflector may be disposed behind the optical modulating element, or it may be disposed within the optical modulating element.

The optical modulating element may comprise an electro-optic layer disposed between a first substrate and a second substrate. The electro-optic layer may be a liquid crystal layer.

The substrate of the transflector may be one of the substrates of the optical modulating element.

According to one aspect of the present invention, there is provided a scattering transflector. The reflectivity of a surface of the scattering transflector is dependent on the angle at which light is incident on the surface of the transflector.

According to an embodiment of the invention, the scattering transflector may include: a substrate having an undulating surface, a plurality of first portions of the undulating surface being inclined in a first direction and a plurality of second portions of the undulating surface being inclined in a second direction different from the first direction: and a reflective material disposed over selected parts of the undulating surface of the substrate. The reflective material may be disposed over a greater area of first portions of the undulating surface than second portions of the undulating surface.

According to an embodiment of the invention, the reflective material may be disposed over substantially all the first portions of the undulating surface of the substrata.

According to an embodiment of the invention, the reflective material may be disposed over all the first portions of the undulating surface of the substrate.

According to an embodiment of the invention, the reflective material may be disposed over substantially none of the second portions of the undulating surface of the substrate.

According to an embodiment of the invention, the reflective material may be disposed over none of the second portions of the undulating surface of the substrate.

According to an embodiment of the invention, the average angle of inclination of each first portion of the undulating surface of the substrate may be equal in magnitude and opposite in sign to the average angle of inclination of each second portion of the undulating surface of the substrate.

According to an embodiment of the invention, the average angle of inclination of each first portion of the undulating surface of the substrate may be different in magnitude and opposite in sign to the average angle of inclination of each second portion of the undulating surface of the substrate.

According to an embodiment of the invention, the reflective material may be a metallic material.

According to an embodiment of the invention, the substrate of the transflector may be selected from a group consisting of a polymer substrate and a glass substrate.

According to an embodiment of the invention, two or more of the portions of the reflective material may be electrically connected to one another.

According to an embodiment of the invention, the scattering transflector may further include a transparent, electrically conductive layer disposed over the undulating surface of the substrate.

According to an embodiment of the invention, the portions of reflective material may be disposed over the transparent, electrically conductive layer.

According to an embodiment of the invention, two or more of the portions of the reflective material layer may be electrically connected to one another by the transparent, electrically conductive layer.

According to an embodiment of the invention, the two or more of the portions of the reflective material layer may be electrically connected to one another by the transparent, electrically conductive layer.

According to an embodiment of the invention, a portion of the substrate may have a thickness of substantially zero.

According to an embodiment of the invention, either the first or second portions of the undulating surface of the substrate may not be flat.

According to an embodiment of the invention, the first portions of the undulating surface of the substrate may have a concave surface in section.

According to an embodiment of the invention, the first portions of the undulating surface of the substrate may have a concave surface in section and the second portions of the undulating surface of the substrate may have a convex surface in section.

According to an embodiment of the invention, the reflective material may be disposed in strips along the first portions of the undulating surface of the substrate.

According to an embodiment of the invention, the strips of reflective material disposed along the first portions of the undulating surface of the substrate may have some degree of randomness, when seen in plan view.

According to an embodiment of the invention, at least one edge of each strip of reflective material may be irregular.

According to an embodiment of the invention, the reflective material may be disposed randomly on the first portions of the undulating surface of the substrate in discrete portions.

According to an embodiment of the invention, the surface of the transflector may include a plurality of discrete raised portions.

According to an embodiment of the invention, the reflective material may be disposed over part of at least some of the discrete raised portions.

According to an embodiment of the invention, the locations of the discrete raised portions may be randomly distributed.

According to another aspect of the present invention, there is provided a display device including an optical modulating element and a scattering transflector. The reflectivity of a surface of the transflector is dependent on the angle at which light is incident on the surface of the transflector.

According to an embodiment of the invention, the transflector may further include: a substrate having an undulating surface, a plurality of first portions of the undulating surface being inclined in a first direction and a plurality of second portions of the undulating surface being inclined in a second direction different from the first direction; and a reflective material disposed over selected parts of the undulating surface of the substrate. The reflective material may be disposed over a greater area of first portions of the undulating surface than second portions of the undulating surface.

According to an embodiment of the invention, in the transflector, the reflective material may be disposed over substantially all the first portions of the undulating surface of the substrate.

According to an embodiment of the invention, in the transflector, the reflective material may be disposed over all the first portions of the undulating surface of the substrate.

According to an embodiment of the invention, in the transflector, the reflective material may be disposed over substantially none of the second portions of the undulating surface of the substrate.

According to an embodiment of the invention, in the transflector, the reflective material may be disposed over none of the second portions of the undulating surface of the substrate.

According to an embodiment of the invention, in the transflector, the average angle of inclination of each first portion of the undulating surface of the substrate may be equal in magnitude and opposite in sign to the average angle of inclination of each second portion of the undulating surface of the substrate.

According to an embodiment of the invention, in the transflector, the average angle of inclination of each first portion of the undulating surface of the substrate may be different in magnitude and opposite in sign to the average angle of inclination of each second portion of the undulating surface of the substrate.

According to an embodiment of the invention, the reflective material of the transflector may be a metallic material.

According to an embodiment of the invention, the substrate of the transflector may be selected from a group consisting of a polymer substrate and a glass substrate.

According to an embodiment of the invention, two or more of the portions of the reflective material may be electrically connected to one another.

According to an embodiment of the invention, the display device may further include a transparent, electrically conductive layer disposed over the undulating surface of the substrate.

According to an embodiment of the invention, the portions of reflective material may be disposed over the transparent, electrically conductive layer.

According to an embodiment of the invention, two or more of the portions of the reflective material layer may be electrically connected to one another by the transparent, electrically conductive layer.

According to an embodiment of the invention, a portion of the substrate may have a thickness of substantially zero.

According to an embodiment of the invention, either the first or second portions of the undulating surface of the substrate may not be flat.

According to an embodiment of the invention, the first portions of the undulating surface of the substrate may have a concave surface in section.

According to an embodiment of the invention, the first portions of the undulating surface of the substrate of the substrate may have a concave surface in section and the second portions of the undulating surface of the substrate may have a convex surface in section.

According to an embodiment of the invention, the reflective material may be disposed in strips along the first portions of the undulating surface of the substrate.

According to an embodiment of the invention, the strips of reflective material disposed along the first portions of the undulating surface of the substrate may have some degree of randomness, when seen in plan view.

According to an embodiment of the invention, at least one edge of each strip of reflective material may be irregular.

According to an embodiment of the invention, the reflective material may be disposed randomly on the first portions of the undulating surface of the substrate in discrete portions.

According to an embodiment of the invention, the surface of the transflector may include a plurality of discrete raised portions.

According to an embodiment of the invention, the reflective material may be disposed over part of at least some of the discrete raised portions.

According to an embodiment of the invention, the locations of the discrete raised portions may be randomly distributed.

According to an embodiment of the invention, at least one portion of the substrate may have a thickness of substantially zero for forming at least one transmissive window.

According to an embodiment of the, invention, the reflective material may not be provided in the at least one transmissive window of the substrate.

According to an embodiment of the invention, the optical modulating element may include an electro-optic layer of a thickness so as to form a half-wavelength retarder in the at least one transmissive window of the substrate and a quarter-wavelength retarder elsewhere.

According to an embodiment of the invention, the transflector may be disposed relative to the optical modulating element such that an angle between the normal to each first portion and the direction in which light is incident on the display surface of the display device is less than the angle between the normal to the display surface of the display device and the direction in which light is incident on the display surface.

According to an embodiment of the invention. the transflector may be disposed behind the optical modulating element.

According to an embodiment of the invention, the transflector may be disposed within the optical modulating element.

According to an embodiment of the invention, the optical modulating element may include an electro-optic layer disposed between a first substrate and a second substrate.

According to an embodiment of the invention, the electro-optic layer may be a liquid crystal layer.

According to an embodiment of the invention, the substrate of the transflector may be one of the substrates of the optical modulating element.

According to still another aspect of the present invention, there is provided a scattering transflector including portions of reflective material and transmissive portions. The ratio between the reflective area and the transmissive area depends on the direction of incidence of light.

According to still another aspect of the present invention, there is provided a display device including an optical modulating element and, a scattering transflector including portions of reflective material and transmissive portions. The ratio between the reflective area and the transmissive area of the scattering transflector depends on the direction of incidence of light.

BRIEF DESCRIPTION OF THE DRAWINGS

Preferred embodiments of the present invention will now be described by way of illustrative examples with reference to the accompanying figures in which.

Like reference numerals denote like components in the description of the preferred embodiments.

DESCRIPTION OF THE PREFERRED EMBODIMENTS

Figure 3A:
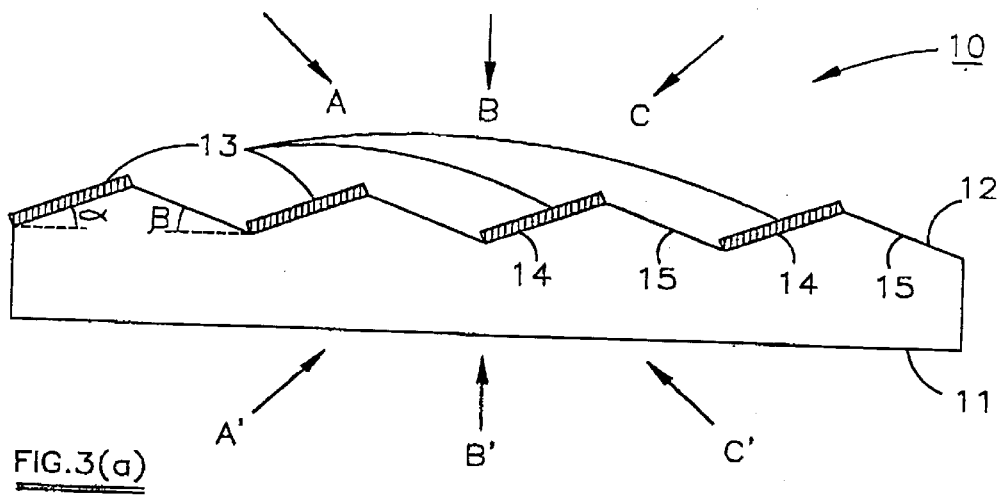
FIG. 3(a) is a schematic sectional view of a transflector according to an embodiment of the present invention.

FIG. 3(a) is a schematic sectional view of a transflector according to an embodiment of the present invention.

FIG. 3(a) is a schematic cross-sectional view of a scattering transflector according to the present invention. The scattering transflector 10 comprises a transparent substrate 11 having an undulating upper surface 12. The lower face of the substrate is generally flat. A reflective material 13 is disposed over part of the undulating surface 12 of the transflector 10.

As so far described, the transflector of FIG. 3(a) is similar to the prior art transflector of U.S. Pat. No. 4,040,727. However, in the prior art transflector of U.S. Pat. No. 4,040,727 the reflective material is disposed at random over the substrate, no that the overall reflectivity and transmissivity of the substrate will be independent of the direction in which light is incident on the transflector. In contrast, in the present invention the reflective material is disposed on the undulating surface of the transflector in such a way that the reflectivity of the transflector, i.e. the magnitude of the overall reflectivity (the reflectivity integrated over all reflected angles), is dependent on the direction on which light is incident on the transflector.

the undulating surface 12 of the transflector 10 comprises first portions 14 that are inclined at a first angle $\alpha$ with regard to the lower surface of the tranoflector. Second portions 15 of the undulating upper surface are inclined at a second angle $\beta$ to the average surface of the transflector. The angle $\alpha$ is opposite in sign to the angle $\beta$. FIG. 3(a) shows four first portions and four second portions of the undulating surface of the substrate.

FIG. 3(a) shows a scattering transflector having a symmetric undulating surface, in which the magnitude of the angle $\alpha$ is equal to the magnitude of the angle $\beta$. However, the invention is not limited to a symmetric scattering transflector, and it is possible for the magnitude of the angle $\alpha$ not to be equal to the magnitude of the angle $\beta$, as will be discussed more fully below.

The reflective material 13 is disposed over the undulating surface 12 of the transflector 10 in such a way that a greater area of the reflective material is disposed over the first portions of the undulating surface than over the second portions of the undulating surface. The apparent area of the upper surface of the transflector that is coated with the reflective material will therefore vary depending on the angle from which the transflector is viewed. For example, an observer viewing the tranoflector 10 in the direction indicated by the arrow A in FIG. 3(a) will perceive that a larger portion of the area of the transflector is covered by the reflective material 13 than will an observer viewing the transflector from the direction indicated by the arrow B. An observer viewing the transflector in the direction indicated by the arrow B will, however, perceive that a larger portion of the area of the transflector is covered by the reflective material 13 than will an observer viewing the transflector 10 from the direction indicated by the arrow C. In consequence, the magnitude of the overall reflectivity of the transflector or the reflectivity of the transflector in the direction of specular reflection will depend on the angle of incidence of light on the transflector. The reflectivity for light incident along the direction indicated by the arrow A in FIG. 3(a) will be greater than the reflectivity for light incident along the direction indicated by the arrow B which, in turn, will be greater than the reflectivity for light incident along the direction indicated by the arrow C. Thus, the ratio between the reflective area and the transmissive area of the transflector is dependent on the angle of incidence of light.

The transmissivity of the transflector of FIG. 3(a) is also dependent on the angle of incidence of light from a backlight on the lower face of the substrate. The transmissivity for light incident along the direction indicated by the arrow A' in FIG. 3(a) will be higher than the transmissivity for light incident along the direction indicated by the arrow B' which, in turn, will be higher than the transmissivity for light incident along the direction indicated by the arrow C'.

Figure 1:
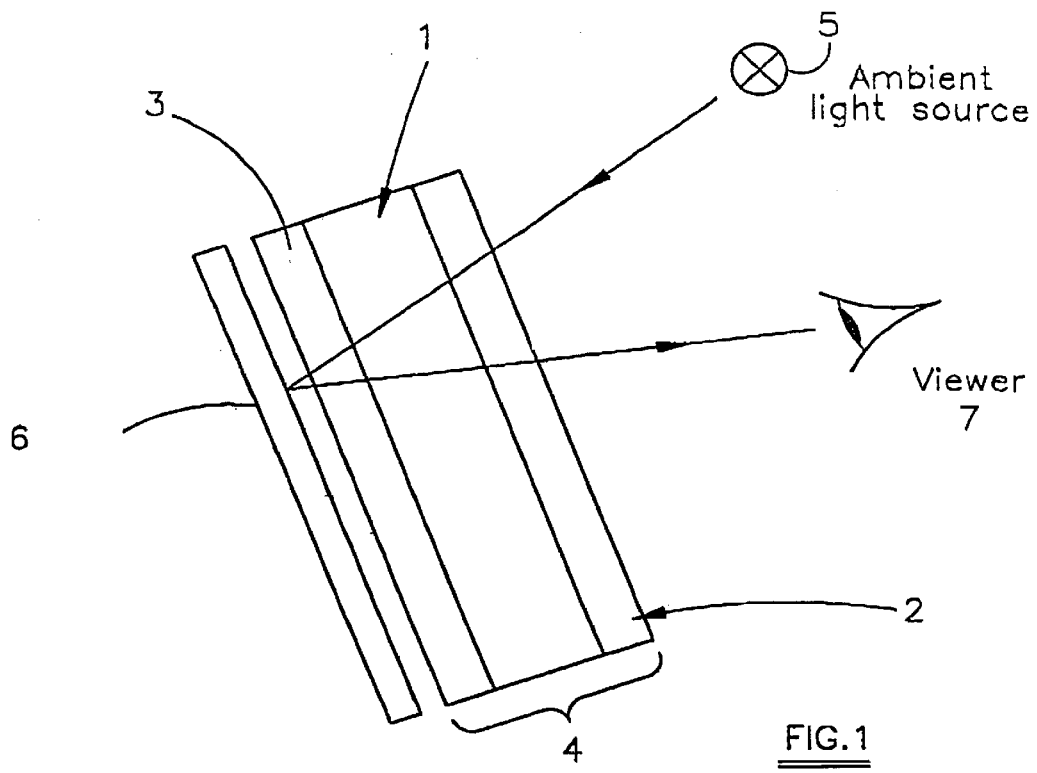
FIG. 1 is a schematic diagram of a conventional reflective display device.
Figure 2:
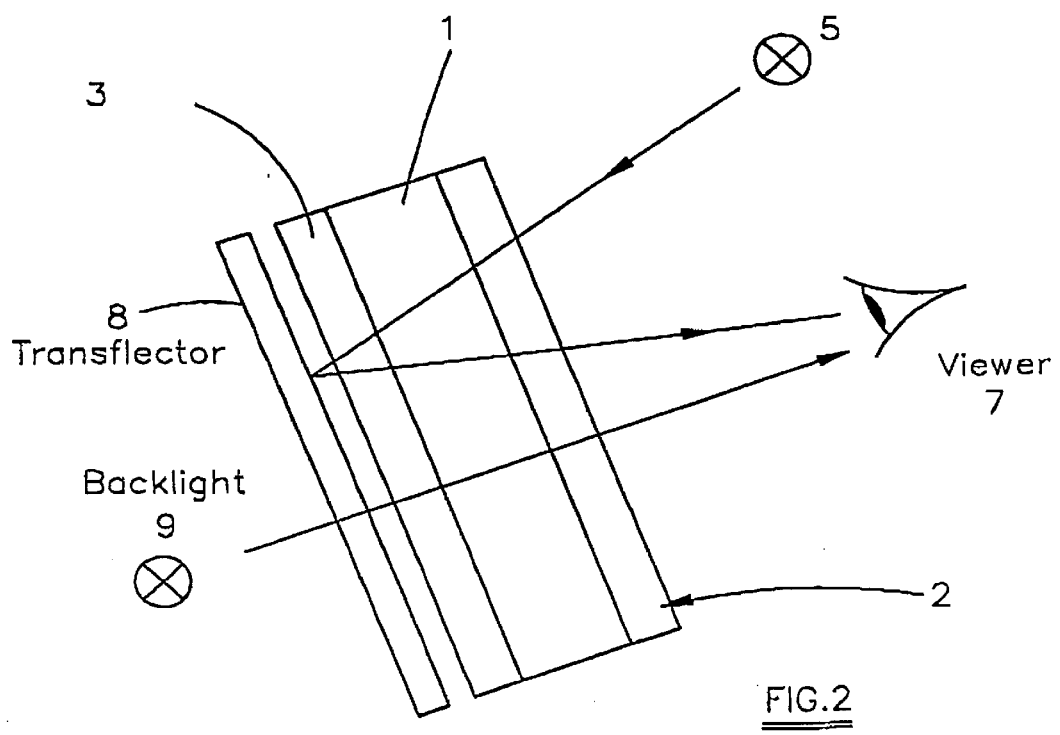
FIG. 2 is a schematic view of a conventional transflective display device.

A transflector according to the present invention can provide both an increased reflectivity and an increased transmissivity compared to prior art transflectors. This is done by using the transflector such that in a reflective mode light is incident from a direction in which it appears that a high proportion of the surface is covered by the reflective material 13. The tranoflector is preferably viewed from a direction in which it appears that a lower proportion of the area of the transflector is covered by the reflective layer 13, so that a bright image is obtained when the optical modulating element is illuminated by the back-light. For example, if the transflector of FIG. 3(a) is used in a display device of the general type shown in FIG. 2, a high reflectivity will be obtained if the ambient light, from the light source 5, is incident on the transflector in the direction indicated by the arrow A. and this will lead to a bright image when the display device is illuminated by the ambient light source. This increased brightness in the ambient light-mode of operation does not, however, lead to a reduced brightness when the display device is illuminated by the back-light. An observer viewing the display device from a direction normal to the display (that is, in the direction indicated by the arrow B) will still see a bright image when the display device is illuminated by the back-light 9, because the transflector has a good transmissivity in the direction B.

Operating the transflector shown in FIG. 3(a) in a transmissive mode does not require light to be transmitted through the reflective material 13. The reflective material 13 can therefore be made as reflective as possible. This can be conveniently done by using a layer of metal that has sufficient thickness to achieve the maximum possible reflectivity. One possible metal that can be used as the reflective material 13 is aluminum.

The substrate 11 of the transflector can be made of any durable transmissive material. The thickness of the substrate should be chosen to provide suitable mechanical strength:for the intended application of the transflector. The substrate is preferably not electrically conductive. Suitable materials for the substrate include glass, a transparent resin, and a transparent polymeric resin.

The width and the angle of inclination of the first and second portions of the undulating surface are chosen to provide the required optical properties of the transflector. In the case of a transflector that is intended to be disposed within a display device. the width of the first and second portion will typically be in the range 1 μm to 100 μm. In the case of a transflector that is intended to be disposed outside a display device, the first and second portion may have any width up to the width of the pixels of the display device.

As noted above, in the transflector of FIG. 3(a) the reflective material 13 is disposed over a greater area of the first portions of the undulating surface than second portions 15 of the undulating surface, so that reflectivity of the transflector or the magnitude of the overall reflectivity (the reflectivity integrated over all reflected angles) is dependent on the angle at which light is incident on the upper surface of the transflector. In the embodiment of FIG. 3(a) this has been done by disposing the reflective material over each of the first portions 14 and over none of the second portions 15, but the invention is not limited to this. It is, however, preferred that the reflective material 13 is disposed over all, or substantially all, of the first portions, and over none, or few, of the second portions.

It is preferable that the width of a portion of the reflective material disposed on a first portion 14 of the undulating surface 12 of the substrate 11 is substantially equal to the width of the first portion 14, since this will maximise the reflectivity of the transflector to light incident from the direction A. The invention is not however limited to a transflector in which the width of each portion of the reflective material is substantially equal to the width of the first portion 14 of the undulating surface 12 on Which it is disposed. In principle, some or all of the portions of reflective material 13 can have a lower width than the corresponding first portion 14 of the undulating surface. Moreover, in principle two or more areas of reflective material could be disposed on a first portion of the undulating surface of the substrate 11, with their combined width being equal to or less than the width of the first portion of the undulating surface.

Figure 3B:
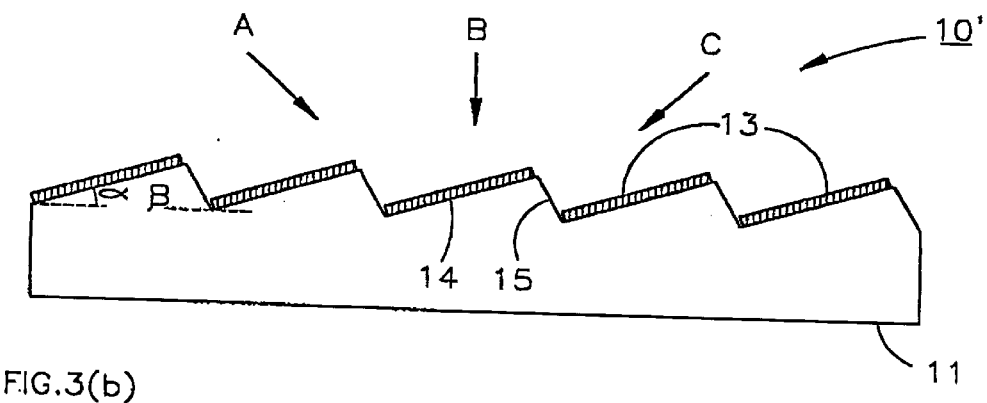
FIG. 3(b) is a schematic sectional view of a transflector according to another embodiment of the present invention.

FIG. 3(b) is a schematic sectional view of a transflector 10' according to a second embodiment of the invention. This is generally similar to the embodiment of FIG. 3(a), except that the transflector 10' of FIG. 3(b) is an asymmetric transflector. In the embodiment of FIG. 3(b) the magnitude of the angle α (the angle of inclination of the first portions) is significantly smaller than the magnitude of the angle β (the angle of inclination of the second portions). It will be seen that the use of an asymmetric transflector increases the apparent proportion of the surface of the transflector that is covered by the reflective layer as perceived by an observer viewing the transflector in the direction A.

In FIGS. 3(a) and 3(b) the first and second portions of the undulating surface are shown as being flat and, where the undulating surface of the substrate is produced by embossing, the first and second portions of the undulating surface may well be substantially flat. The invention is not, however, limited to a transflector in which the first and second portions of the undulating surface are flat.

Figure 3C:
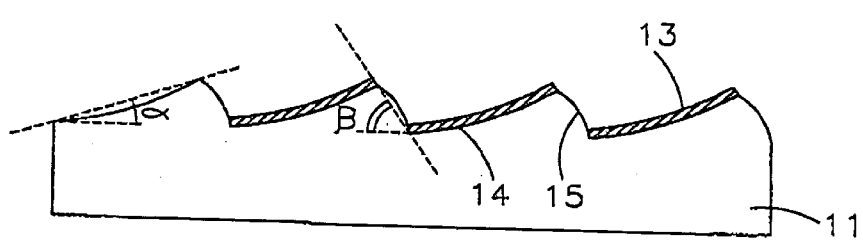
FIG. 3(c) is a schematic sectional view of a transflector according to a further embodiment of the present invention.

FIG. 3(c) i a schematic sectional view of a transflector according to a further embodiment of the invention. This is generally similar to the transflector of FIG. 3(b), except that the first and second portions are not flat. In the embodiment of FIG. 3(c), the first portions 14 have a concave surface in section, and the second portions 15 have a convex surface in section. The transflector of FIG. 3(c) could be produced by, for example, a process in which the substrate is etched to produce the undulations, or by a process in which the material is deposited on a flat substrate. For the transflector of FIG. 3(c), the angles α and β are defined as the average angle of inclination of the first portions and the average angle of inclination of the second portions, respectively.

In FIG. 3(c) the reflective material is not shown on the left-hand first portion, for clarity of illustration of the average angle of inclination of the first portions. As noted above, however, it is generally preferable for the reflective material to be disposed over as greater an area of the first portions of the undulating surface of the substrate as possible.

FIG. 3(c) shows an asymmetric transflector in which the first and second portions of the undulating surface of the substrate are not flat. It is also possible to provide a symmetric transflector in which the first and second portions of the undulating surface of the substrate are not flat.

In the transflector of FIG. 3(c) the first portions 14 of the undulating surface have a surface that is concave in section, and the second portions 15 of the undulating surface have a surface that is convex in section. The invention is not, however, limited to this, but can be applied to any transflector in which the first portions and/or the second portions of the undulating surface are not flat, as well as to a transflector in which both the first portions and the second portions of the undulating surface are flat.

The transflectors shown in FIGS. 3(a), 3(b) and 3(c) can be provided with a planarisation layer over the reflective material 13 and the undulating surface 12 of the substrate. (A planarisation layer is not shown in FIGS. 3(a), 3(b) and 3(c)). Providing a planarisation layer reduces the variations in the thickness of the transflector. This can be beneficial when the transflector is incorporated within a liquid crystal display device, since some liquid crystal modes are susceptible to variations in the thickness of the liquid crystal layer.

Figure 4A:
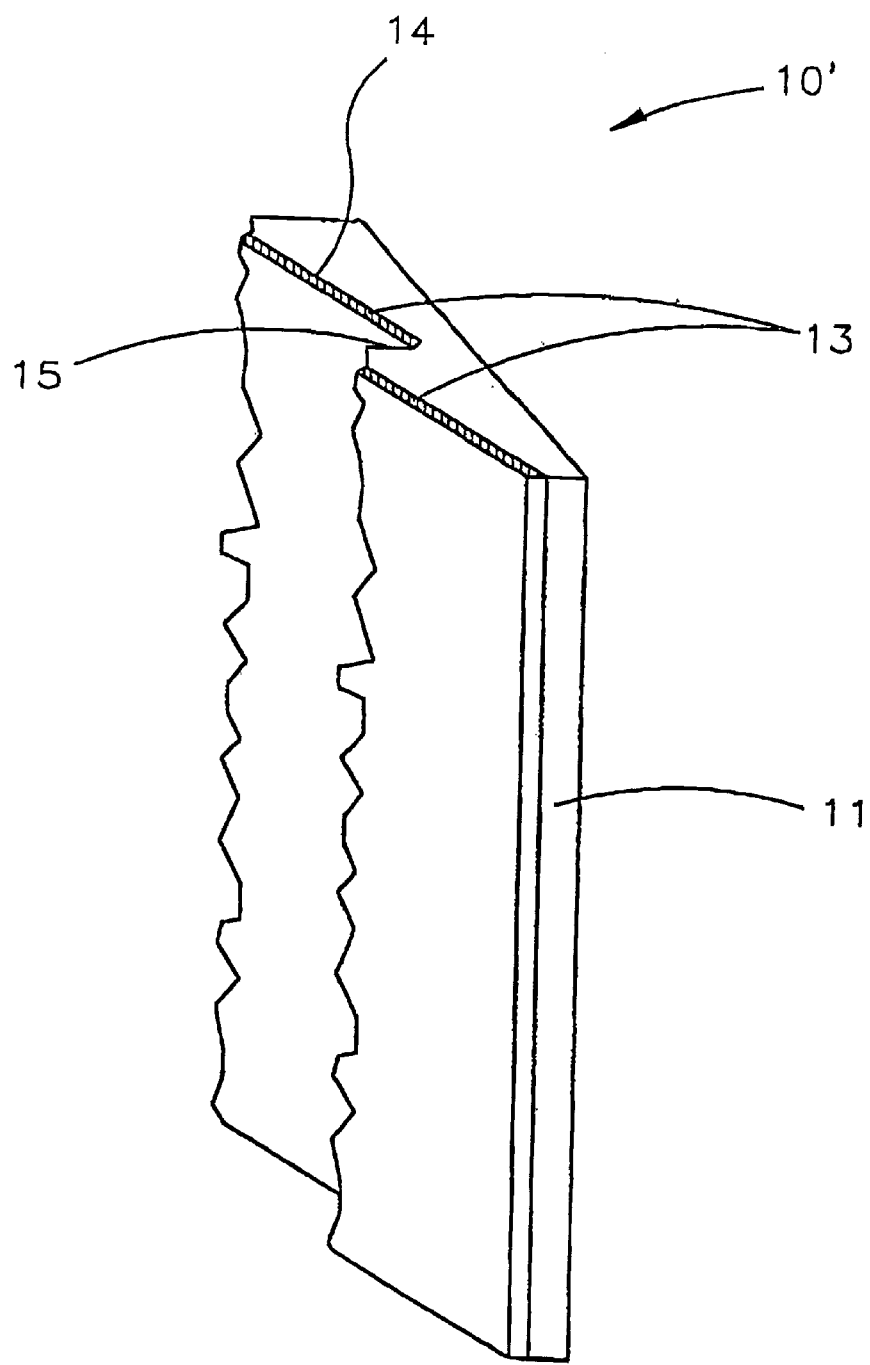
FIG. 4(a) is a schematic perspective view of a transflector according to an embodiment of the present invention.

FIG. 4(a) shows a tranoflector of the present invention in perspective view. FIG. 4(a) shows two first portions and two second portions of the undulating surface of the substrate.

In the embodiment of FIG. 4(a) the reflective material 13 is disposed in strips along the first portions 14 of the undulating surface of the substrate. In principle the strips of reflective material 13 could have straight edges, but there is the potential problem that disposing the reflective material on the substrate as regular, evenly-spaced strips could lead to diffraction occurring if the transflector were illuminated by a single light source. It is therefore preferable that the strips of reflective material disposed on the substrate have some degree of randomness, when seen in plan view, to prevent diffraction occurring. In the embodiment of FIG. 4(a) one edge of each strip of reflective material is irregular, and this will provide randomness and so prevent diffraction from occurring. If it were desired to in-crease the randomness further, the other edge of each strip of reflective material could also be made irregular.

Figure 4B:
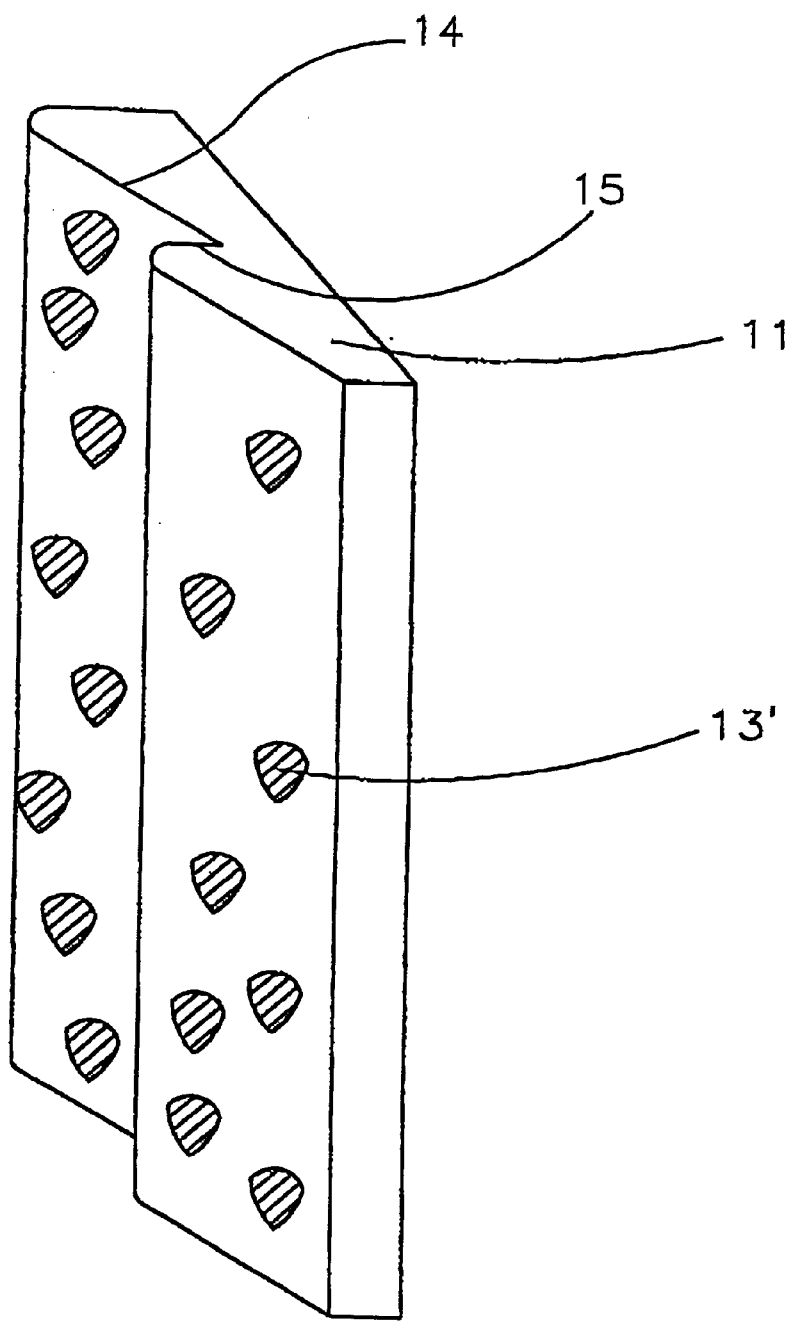
FIG. 4(b) is a schematic perspective view of a transflector acting to another embodiment of the present invention.

FIG. 4(b) shows another embodiment of a transflector of the present invention in perspective view. FIG. 4(b) again shows two first portions and two second portions of the undulating surface of the substrate of the transflector.

In the transflector of FIG. 4(b) the reflective material 13 is disposed on the first portions 14 of the undulating surface of the substrate in discrete portions 13'. The portions 13' of the reflective material are preferably disposed randomly or semi-randomly on the first portions of the undulating surface of the substrate, to prevent diffraction occurring. The portions 13' of the reflective material can be, for example, circular; however, the portions 13' of the reflective material preferably have an irregular shape or an anisotropic shape, to increase the randomness of the reflective material.

FIGS. 4(a) and 4(b) each show an asymmetric transflector, but the principles illustrated in FIGS. 4(a) and 4(b) can be applied also to a symmetric transflector.

In another embodiment of the invention (not illustrated) the surface of the transflector consists of a plurality of discrete raised portions or "bumps". The locations of the bumps are preferably random or semi-random. In this embodiment, the surface of the substrate as seen in two orthogonal directions will contain undulations. The undulations may be symmetric in both directions, or they may be asymmetric in at least one direction. In this embodiment, the reflective material is disposed over part of some or each of the bumps.

Figure 5:
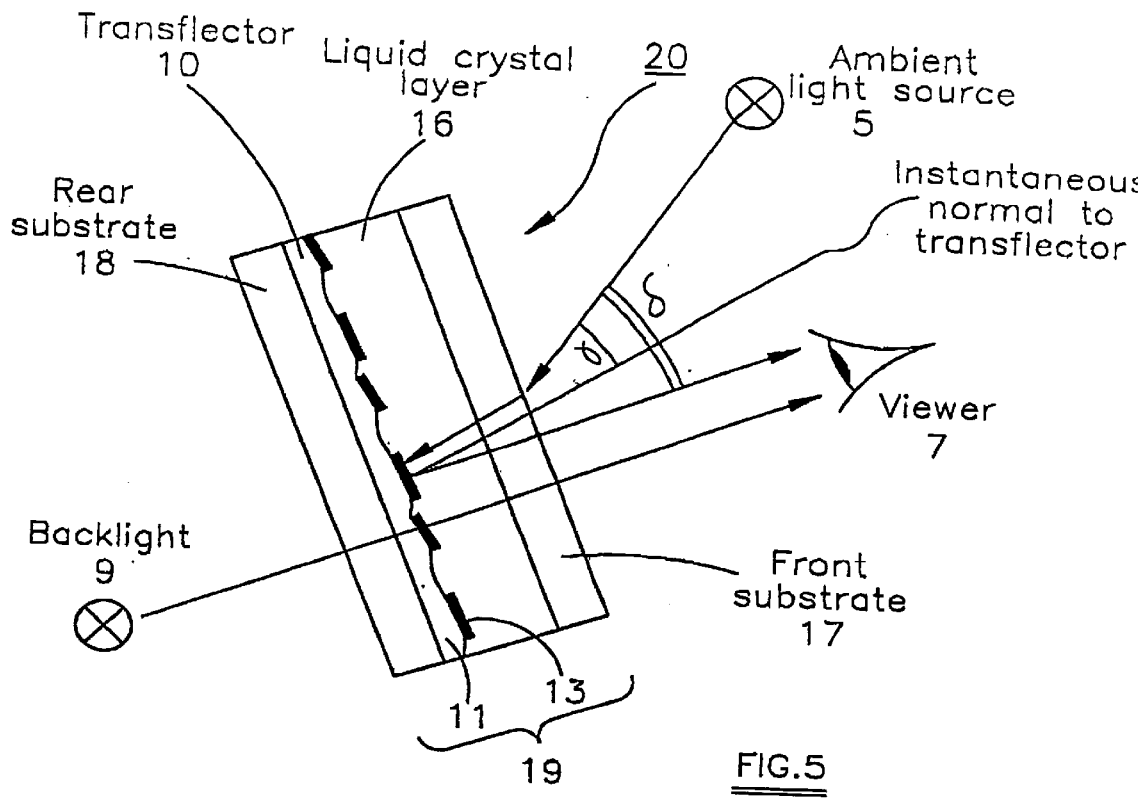
FIG. 5 is a schematic sectional view of a transflective display device according to an embodiment of the present invention.

FIG. 5 shows a transflective display device according to an embodiment of the invention. This display device 20 comprises an optical modulating element 19 and a transflector 10. The transflector 10 is a transflector according to the present invention and, in the embodiment of FIG. 5, is a symmetric scattering transflector of the type shown in FIG. 3(a).

The optical modulating element 19 is formed of a liquid crystal layer 16 which acts, in use, as an electro-optic layer. The liquid crystal layer 16 is disposed between a transparent front substrate 17 and a transparent rear substrate 18. (The terms "front" and "back" refer to the orientation of the device when it is in use; in use, the front substrate 17 in disposed towards a viewer and the back substrate 18 is disposed away from the viewer.)

In the display device shown in FIG. 5 the transflector 10 is disposed within the optical modulating element 19. The transflector 10 is disposed on the rear substrate 18, between the rear substrate 18 and the liquid crystal layer 16.

The operation of the device of FIG. 5 when illuminated by ambient light incident on the front substrate 17 will now be described. For convenience of description it will be assumed that the ambient light is provided by a point source 5 of ambient light.

Light from the ambient light source 5 is incident on the front surface of the front substrate 17, undergoes refraction and is transmitted into the optical modulating element 19. (In practice, some part of the ambient light will be reflected by the front surface of the front substrate 17, but this reflected light has been omitted from FIG. 5 for clarity of description.) When the ambient light is incident on the scattering transflector 10, that part of the ambient light that is incident on the reflective material 13 will be reflected and will pass back through the liquid crystal layer 16 and be observed by a viewer 7.

According to the present invention, the transflector 10 is disposed in the display device 20 such that the majority of the reflective material 13 is placed on portions of the undulating surface of the tranoflector where the angle γ between the general direction of ambient light at the front surface of the front substrate 17 and the instantaneous surface normal of the undulating surface is smaller than the angle δ a between the general direction of ambient light and the normal to the front surface of the front substrate 17 of the display device 20. (In FIG. 5 the light reflected from the transflector 10 is assumed to propagate in the direction normal to the front face of the front substrate 17.) This ensures that the ambient light is incident on the transflector 10 from a direction in which the apparent proportion. of the surface of the transflector that is covered with the reflective material 13 appears to be large.

According to the invention, the majority of areas of the undulating surface of the transflector where the angle between the general direction of ambient light and the surface normal of the transflector is larger than the angle between the general direction of ambient light and the normal to the front surface of the display are transparent. Ambient light will not be reflected from these areas of the scattering transflector. However, in conditions of low ambient light, the optical modulating element 19 can be illuminated by a back-light 9, and light from the back-light will be transmitted to the viewer 7 through parts of the transflector that are not provided with the reflective layer 13.

In the display device of FIG. 5, the relative ratio between the reflective layer of the transflector 10 and the transmissive area of the transflector 10 is greater for the ambient light, which is incident on the display at an oblique angle than it is for a viewer viewing the device in a normal direction. In contrast, in a prior art device in which the entire surface of the reflector is coated with a partially-reflective, partially-transmissive film, the ratio between the reflectivity and. the transmissivity is independent of the direction in which light is incident on the transflector, since each part of the surface of the transflector has the same transmissivity and the same reflectivity as every other part of the surface of the transflector. Similarly, in a prior art display device that uses a transflector of the type disclosed in U.S. Pat. No. 4,040,727, in which reflective portions are distributed randomly over the surface of the transflector, the ratio between the transmissive area of the transflector and the reflective area of the tranoflector will also be independent of the viewing direction of the transflector.

By using a transflector of the present invention, in which the ratio between the reflective area and the transmissive area of the transflector is dependent on the direction of incidence, the brightness of the device when operating in a reflective mode can be increased. The transflector can be provided with a high reflectivity to ambient Light incident at an oblique angle on the display, so that a bright image will be obtained when the device is illuminated by ambient light. However, the transflector can also be provided with a high transmissivity to light incident in the normal direction so that the brightness of a displayed image when the optical modulating element is illuminated by the back-light 9 will not be reduced.

It is possible to use a transflector of the present invention in a display device because, in many cases, the direction in which ambient light is incident on the display device will normally be known. For example, in many cases a display device will be intended for use with ambient light that is incident from an overhead direction, so that the transflector 10 can be positioned so that most, preferably all, the portions of reflective material 13 will face towards this direction.

FIG. 5 is a schematic sectional view through the display device 20, and illustrates the optical paths of light through the display device when the device is illuminated by the ambient light source 5, or by the back-light 9. Components of the display device that are not relevant to the optical paths through the display device have been omitted from FIG. 5 for clarity. In practice, however, the device of FIG. 5, will be provided with some or all of the following components:

- a planarisation layer disposed over the undulating surface of the substrate of the transflector;
- front and rear electrodes for addressing the liquid crystal (if desired, the reflective material 13 of the transflector can be used as the rear electrodes, in which case only front electrodes need to be provided);
- via passages in the transflector to enable electrical connection to be made to the TFT and rear electrodes;
- switching elements, for example such as thin film transistors, for controlling the voltage applied to the rear electrodes (or to the portions of the reflective material 13 if these are used as the rear electrode);
- one or more polarisers;
- one or more retardation films; and
- a scattering film disposed on the front surface of the front substrate, to reduce specular reflection from the front of the front substrate.

In the case of a display device in which the display is divided into pixels, if the reflective material 13 is used as the rear electrode for addressing the liquid crystal layer it is desirable that all portions of the reflective material in one pixel are electrically connected together. This is to ensure that the same voltage is written into all parts of the liquid crystal layer in a pixel.

The display device shown in FIG. 5 can be used with many types of liquid crystal materials. In one example, the liquid crystal layer 16 could be a layer of a twisted nematic (TN) liquid crystal, or a super-twisted nematic (STN) liquid crystal material. If a layer of a TN liquid crystal material or a STN liquid crystal material is used, then the liquid crystal layer 16 must be interposed between two polarisers. In this case, one polariser would be disposed between the viewer and the liquid crystal layer, and the other polariser would be disposed between the back-light 9 and the liquid crystal layer 16.

Other types of liquid crystal layer would not require the use of two polarisers. For example, if the liquid crystal layer 16 is a layer of a guest-host liquid crystal material, then only one polariser, or possibly no polariser, will be required.

Figure 6:
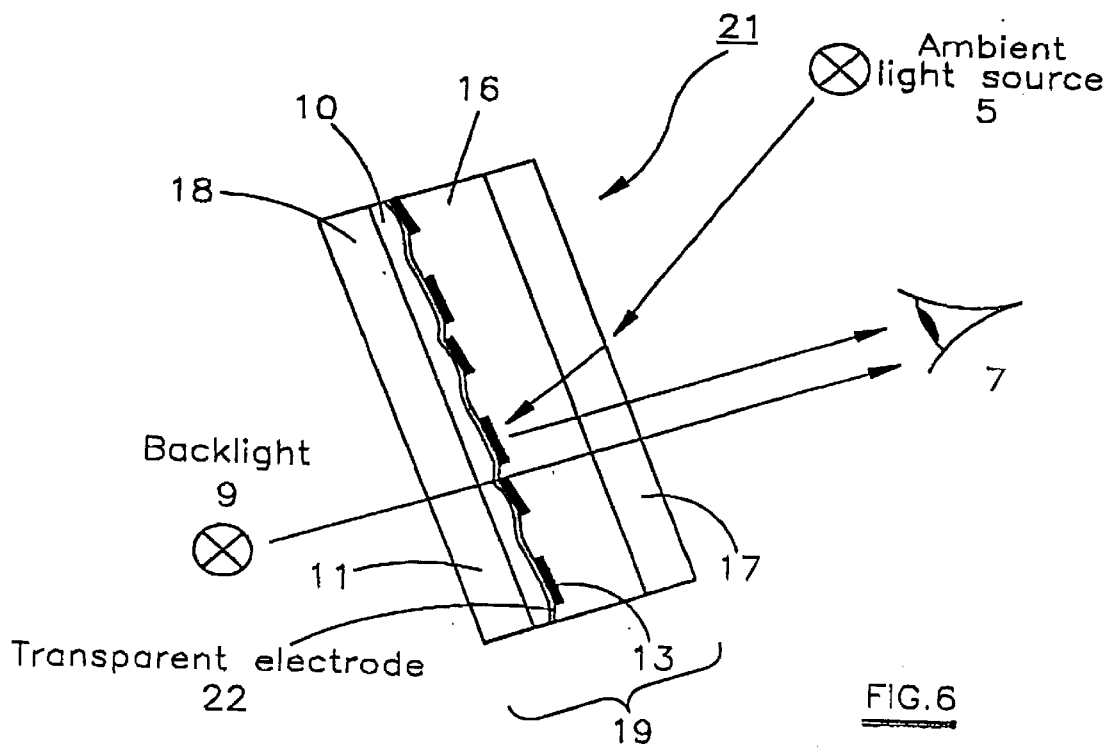
FIG. 6 is a schematic sectional view of a transflective display device according to an embodiment of the present invention.

FIG. 6 shows a second embodiment of a transflective display device according to the present invention.

FIG. 6 is a schematic sectional view of a display device 21 that comprises an optical modulating element 19 and a scattering transflector 10. As with the display device 20 shown in FIG. 5, the transflector 10 is disposed within the optical modulating element 19. The optical modulating element 19 again consists of a liquid crystal layer 16 disposed between a front substrate 17 and the scattering transflector 10. A rear substrate 18 is disposed behind the transflector 10.

The scattering transflector 10 used in the display device 21 is a symmetric scattering transflector that is generally similar to the transflector 10 used in the display device 20 of FIG. 5. The transflector 10 of FIG. 6 does, however, additionally comprise a transparent electrode 22 that is disposed over the entire undulating upper surface 12 of the transflector 10. The reflective material 13 is disposed over the transparent electrode 22. The transparent electrode can be, for example, a thin metallic film, or a film of indium tin oxide (ITO). The transparent electrode electrically connects the portions of reflective material 13 to one another.

In the embodiment of FIG. 5, if the reflective material 13 is used as the rear electrode to address the liquid crystal layer 16, then the electric field applied across the liquid crystal layer will not be homogeneous. This is because an electric field will be applied where the reflective material 13 is present, but no electric field will be applied where the reflective material 13 is not provided. In the embodiment of FIG. 6, the provision of the transparent electrode 22 over the entire upper surface of the transflector means that an homogeneous electric field will be applied across the liquid crystal layer.

In the case of a pixelated display device, the portion of the transparent electrode corresponding to one pixel would need to be electrically insulated from the portions of the transparent electrode corresponding to other pixels. Each portion of the transparent electrode would then act as a pixel electrode for the corresponding pixel. Alternatively, if the pixel electrodes are disposed on the front substrate 17 so that the transparent electrode 22 and the reflective material 13 act as a common electrode for the entire device, there it no need to pattern the transparent electrode in this way.

In FIG. 6 the transparent electrode 22 is disposed over the undulating surface of the substrate 11 of the tranoflector and the reflective material 13 is disposed over the transparent electrode 22. In principle, however, the transparent electrode 22 could be disposed over the reflective material 13.

As is the case with FIG. 5, the display device of FIG. 6 would be provided with other components such as a front electrode, thin film transistors for controlling the electrodes, one or more polarisers, one or more retardation films, and a front scattering film. These components have been omitted from FIG. 6 for clarity of description.

Figure 7:
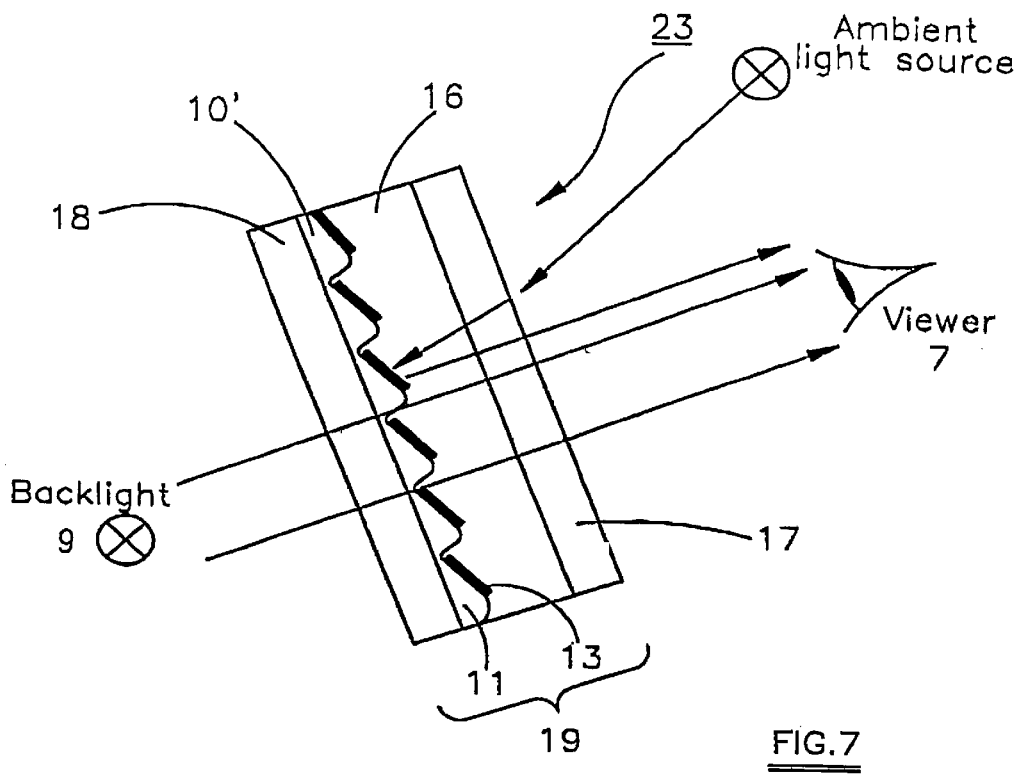
FIG. 7 is a schematic sectional view of a transflective display device according to a further embodiment of present invention.

FIG. 7 is a schematic sectional view of a display device according to a third embodiment of the present invention. The display device 23 of FIG. 7 is generally similar to the display device 20 of FIG. 5, except that the display device of FIG. 7 uses an asymmetric scattering transflector 10' of the type shown generally in FIG. 3(*b*).

As is the case with FIGS. 5 and 6, the display device of FIG. 7 would be provided with other components such as a front electrode, thin film transistors for controlling the electrodes, one or more polarisers, one or more retardation films, and a front scattering film. These components have been omitted from FIG. 7 for clarity of description.

The scattering transflector 10' of the display device 23 of FIG. 7 could be provided with a transparent electrode similar to the transparent electrode 22 shown in FIG. 6.

Figure 8:
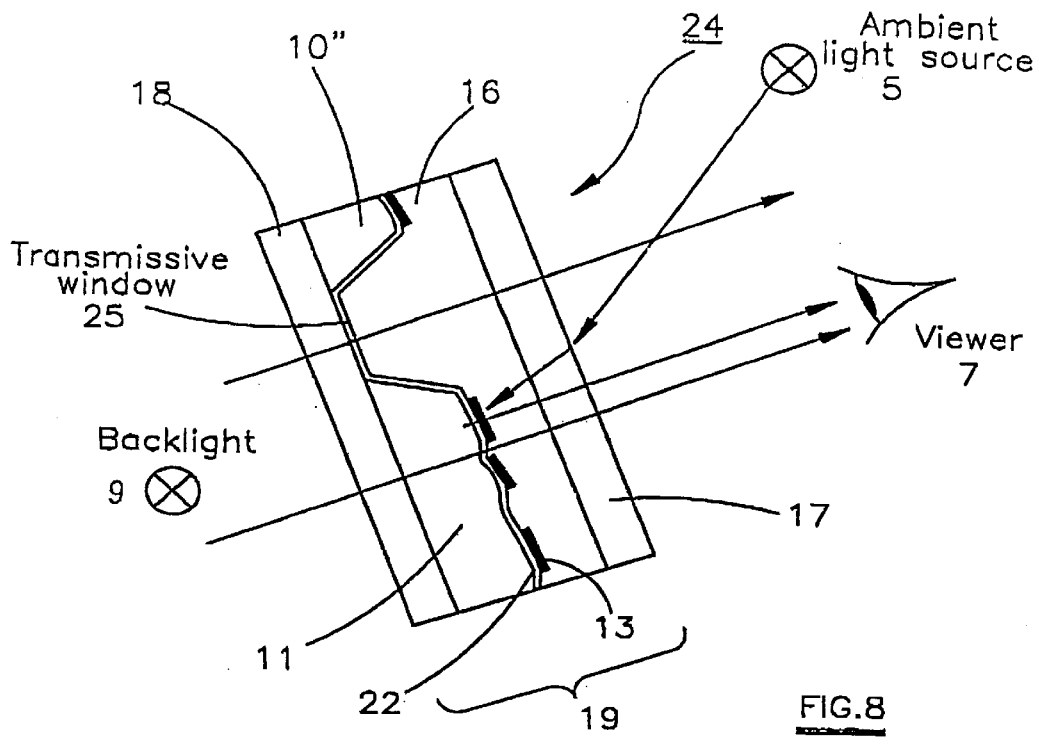
FIG. 8 is a schematic sectional view of a transflective display device according to a further embodiment of the present invention.

FIG. 8 shows a display device 24 according to a fourth embodiment of the present invention. The display device 24 of FIG. 8 again comprises an optical modulating element 19 that comprises a liquid crystal layer 16 disposed between a front substrate 17 and a rear substrate 18. A symmetric scattering transflector 10" of the present invention is disposed within the optical modulating element 19, between the liquid crystal layer 16 and the rear substrate 18. The scattering transflector 10" of the display device 24 is generally similar to the transflector shown in FIG. 3(*b*), but it in provided with a transmissive window 25. In the transmissive window, the thickness of the substrate 11 of the transflector 101 is reduced to substantially zero. The reflective material 13 is not provided in the transmissive window 25 of the transflector 10".

When the display device 24 of FIG. 8 is illuminated by the back-light 9, light can reach the viewer either by passing through the transmissive window 25 in the transflector 10", or by passing through portions of the transflector where the reflective material 13 is not provided. Thus, the brightness of the display when illuminated by the back-light 9 is increased.

A transmissive window 25 of the type shown in FIG. 8 is used in the Advanced TFT LCD manufactured by Sharp Corporation. The thickness of the liquid crystal layer is chosen to form a λ/2 retarder in the transmissive window 25 and to form a λ/4 retarder elsewhere.

The transflector 10" of the display device 24 is provided with a transparent conductive film 22 that is disposed over the entire upper surface of the tranoflector. The transparent conductive film is also provided in the transmissive window 25.

As is the case with the previously-described display devices, the display device of FIG. 8 would be provided with other components such as a front electrode, thin film transistors for controlling the electrodes, one or more polarisers, one or more retardation films, and a front scattering film. These components have been omitted from FIG. 8 for clarity of description.

Figure 9:
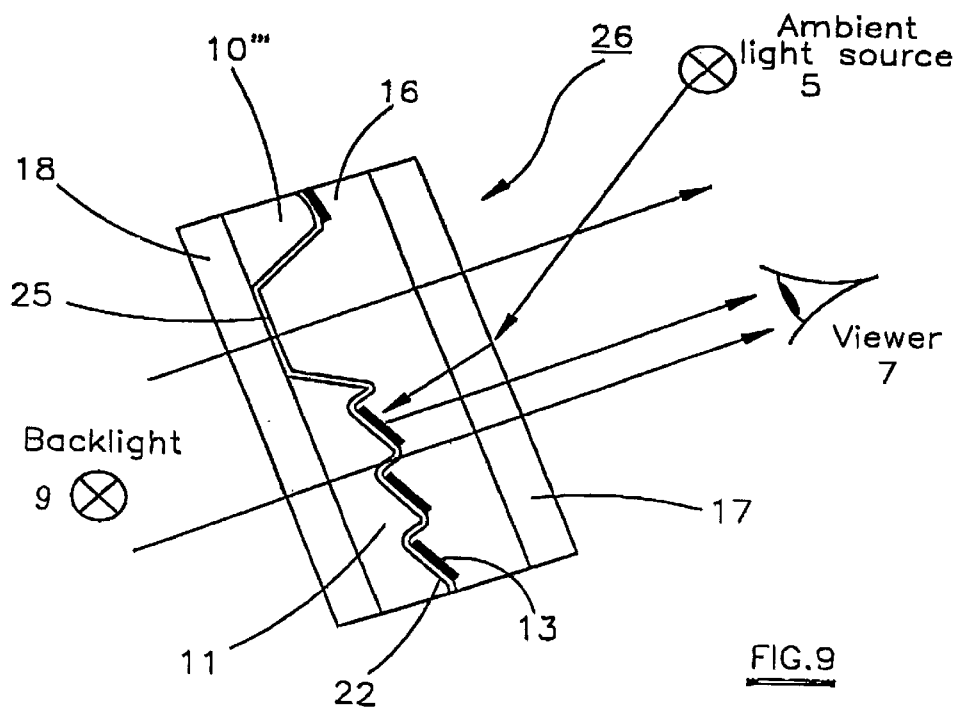
FIG. 9 is a schematic sectional view of a transflective display device according to a further embodiment of the present invention.

FIG. 9 shows a display device 26 according to a fifth embodiment of the present invention. The display device 26 of FIG. 9 is generally similar to the display device 24 of FIG. 8, except that it is provided with an asymmetric scattering transflector 10''' rather than the symmetric scattering tranoflector of FIG. 8. As with the display device 24 of FIG. 8, the scattering transflector 10''' of the display device 26 of FIG. 9 is provided with a transmissive window 25 in which the thickness of the substrate 11 of the transflector is reduced to substantially zero. As in the case of FIG. 8, the scattering transflector 10''' of the display device 26 of FIG. 9 is provided with a transparent electrode 22 disposed over its entire upper surface; the transparent electrode 22 is also provided in the transmissive window 25. The reflective material 13 is disposed over the transparent electrode 22.

In principle, more than one transmissive window could be provided in each pixel.

As is the case with the previously-described display devices, the display device of FIG. 9 would be provided with other components such as a front electrode, thin film transistors for controlling the electrodes, one or more polarisers, one or more retardation films, and a front scattering film. These components have been omitted from FIG. 9 for clarity of description.

Figure 10:
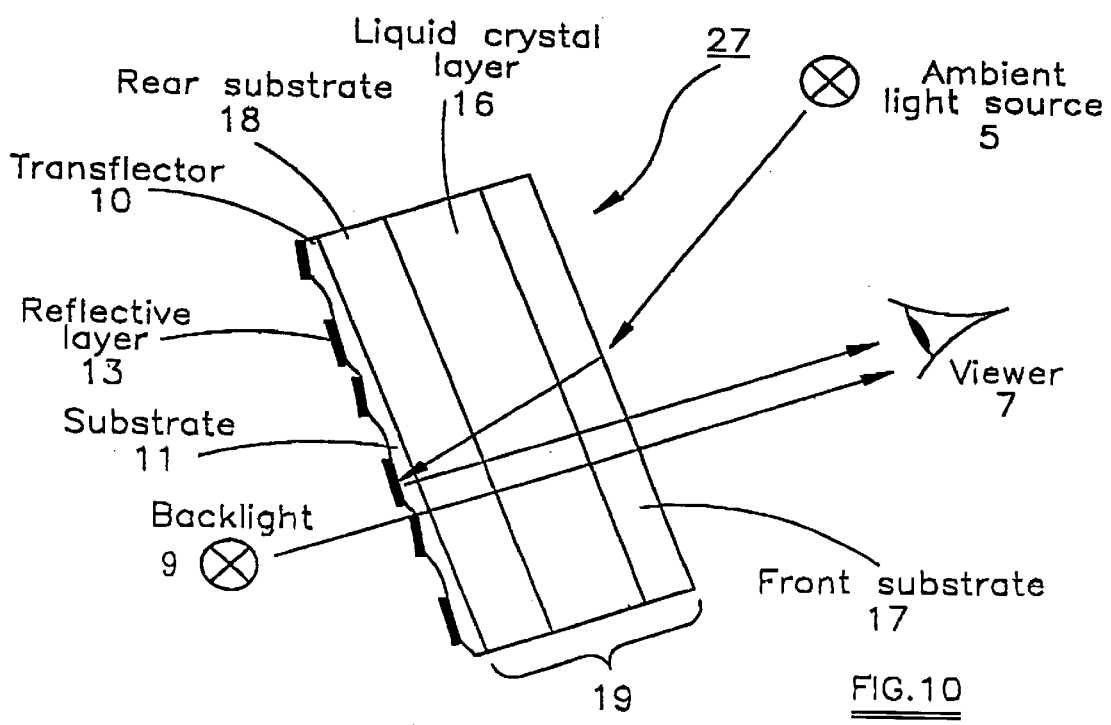
FIG. 10 is a schematic sectional view of a transflective display device according to a further embodiment of the present invention.

FIG. 10 shows a display device 27 according to a sixth embodiment of the present invention. The display device 27 of FIG. 10 again has an optical modulating element 19 formed of a layer 16 of liquid crystal material disposed between a front substrate 17 and a rear substrate 18. The display device further comprises a scattering transflector of the present invention, and the scattering transflector is generally similar to the symmetric scattering transflector 10 shown in FIG. 3(*a*). In contrast to the previous embodiments of display devices of the invention, however, the scattering transflector 10 of the display device 27 is disposed outside the optical modulating element 19.

In FIG. 10, the transflector 10 has been mounted on the rear surface of the rear substrate 18 of the optical modulating element, with the flat surface of the substrate 11 of the transflector in contact with the rear surface of the rear substrate 18 of the optical modulating element. Light from the ambient light source passes through the optical modulating element and through the substrate 11 of the transflector 10. Light that is incident on a portion of the reflective material 13 will be reflected back through the substrate 11 of the transflector 10, and through the optical modulating element 19 to a viewer.

Mounting the transflector 10 on the rear face of the rear substrate 18 of the optical modulating element with the flat surface of the substrate 31 of the transflector in contact with the rear face of the rear substrate 18 of the optical modulating element is convenient, since the transflector can be attached to the rear substrate 18 using, for example, a transparent adhesive. In principle, the transflector 10 could be disposed with the reflective material 13 between the optical modulating element 19 and the substrate 11 of the transflector, but this would require additional mounting means to retain the transflector 10 in position.

As is the case with the previously-described display devices, the display device 27 of FIG. 10 would be provided with other components such as a front electrode, thin film transistors for controlling the electrodes, one or more polarisers, one or more retardation films, and a front scattering film. These components have been omitted from FIG. 10 for clarity of description.

In principle, the transflector 10 could be provided with a transparent electrode 22 on its undulating surface so that the portions of the reflective material 13 are electrically connected to one another.

In principle the reflective material 13 of the tranoflector 10 could be used as the rear electrode for driving the liquid crystal layer in the display device 27 of FIG. 10. It should be noted however that, because the reflective material 13 is not adjacent to the liquid crystal layer 16, if the reflective material 13 were used as the rear electrode the electric field would be set up over both the rear substrate 18 and the liquid crystal layer 16.

If the display device 27 of FIG. 10 is used with a liquid crystal material that requires a polarizer to be disposed behind the liquid crystal layer 16, such a rear polariser could be disposed between the liquid crystal layer 16 and the rear substrate 18 of the optical modulating element. Alternatively, the rear polariser could be disposed behind the rear substrate 18 of the optical modulating element, between the rear substrate 18 of the optical modulating element and the transflector 10.

The display device 27 of FIG. 10 is provided with a symmetric scattering transflector 10 of the type shown generally in FIG. 3 above. It would alternatively be possible for the display device 27 of FIG. 10 to be provided with an asymmetric scattering transflector of the type shown generally in FIG. 4 above.

In the manufacture of a transflector according to the present invention, the first step is to manufacture the substrate 11 of the transflector. In the case of a transflector that is intended to be used outside an optical modulating element, the substrate may be manufactured simply by embossing or stamping a transparent polymer sheet to provide the desired undulating surface. Alternatively, the undulating surface could be provided by depositing additional material, for example a transparent resin, on selected areas of a polymer sheet in order to increase the thickness of the polymer sheet in these areas.

The substrate could alternatively be manufactured by starting with a glass sheet, and etching selected areas of the glass sheet to reduce their thickness, or depositing a transparent resin on selected areas to vary their thickness by lithography.

Once the substrate has been manufactured with the desired undulating surface, metal is deposited onto the undulating surface by an evaporation technique. In order to ensure that the reflective material is not deposited over the entire undulating surface, an oblique evaporation technique is preferably used. That is to say, the reflective material is deposited on the substrate so that it is incident on the substrate at an oblique angle. This will result in the deposition of a layer of reflector material that has a varying thickness. Areas of the undulating surface that point away from the evaporation source (that is, where the angle between the evaporation source and the surface is larger than 180°) will not receive any reflective material, and the deposition thickness of the reflective material in these areas will be zero. Areas of the surface that point towards the evaporation source will receive a predetermined thickness of reflector material, and this thickness will be determined by the length of the evaporation process, and the evaporation rate. Thus, the reflectivity of the transflector will vary continuously between 0% and 100% of the theoretical maximum.

The deposition of the reflective material is preferably carried out such that the deposition direction is substantially equal to the angle in which ambient light will be incident on the transflector when it is incorporated into a display device.

In order to manufacture the substrate of a transflector that is intended to be disposed within an optical modulating element, the undulating surface of the substrate of the transflector can be manufactured on a glass or polymeric substrate. One suitable technique is to deposit a photo-sensitive material over the substrate, and emboss or stamp the desired undulating surface into the photo-sensitive material. The photo-sensitive material can also be patterned by photo-lithography, for example to provide the undulating surface of the substrate and/or the transmissive windows 25 shown in FIGS. 8 and 9.

Alternatively, a transparent material, for example a transparent resin, could be deposited over selected areas of a glass or polymeric substrate in order to build up the required profile of the undulating surface for the transflector.

The glass or polymeric substrate of the transflector may also act as the lower substrate 18 of the display device.

Once the substrate for the transflector has been provided with the required undulating surface, a reflective layer, for example a metallic layer, can be deposited over the substrate by, for example, a sputtering or evaporation process. The deposition process is carried out with the angle between the source and the substrate being approximately 90°, so that the entire undulating surface will be covered by the reflective layer. The reflective layer can then be removed from areas that are desired to be transparent, using suitable masking and etching steps.

If it is desired to deposit a transparent electrode, such as the electrode 22 in FIG. 7, this should be done before the reflective layer is deposited. The transparent electrode can be deposited by a conventional sputtering or evaporation process in which the angle between the source and substrate is approximately 90°. If it is necessary to pattern the transparent electrode, for example into sections that correspond with pixels of the display device, this can be done using conventional masking and etching techniques before the reflective layer is deposited.

Where it is desired to use the reflective layer 13 as an electrode of the display device, means for switching the electrodes on and off, such as thin film transistors, are required. In this case, a via hole can be provided in the substrate of the reflector, to allow electrical connection to be made to the TFT. Such a via can be made using the same photo-lithographic technique as used to produce a transmissive window in the substrate of the transflector.

What is claimed is:

1. A scattering transflector comprising a substrate having an undulating surface, a plurality of first portions of the undulating surface being inclined in a first direction and a plurality of second portions of the undulating surface being inclined in a second direction different from the first direction and a reflective material disposed over selected parts of the undulating surface of the substrate:

wherein the reflective material is disposed over a greater area of first portions of the undulating surface than second portions of the undulating surface, and the reflectivity of a surface of the transflector is dependent on the angle at which light is incident on the surface of the transflector.

2. The scattering transflector according to claim 1, wherein the reflective material is disposed over substantially all the first portions of the undulating surface of the substrate.

3. The scattering transflector according to claim 2, wherein the reflective material is disposed over all the first portions of the undulating surface of the substrate.

4. The scattering transflector according to claim 2, wherein the reflective material is disposed over substantially none of the second portions of the undulating surface of the substrate.

5. The scattering transflector according to claim 2, wherein the reflective material is disposed over none of the second portions of the undulating surface of the substrate.

6. The scattering tranoflector according to claim 1, wherein the average angle of inclination of each first portion of the undulating surface of the substrate is equal in magnitude and opposite in sign to the average angle of inclination of each second portion of the undulating surface of the substrate.

7. The scattering transflector according to claim 1, wherein the average angle of inclination of each first portion of the undulating surface of the substrate is different in magnitude and opposite in sign to the average angle of inclination of each second portion of the undulating surface of the substrate.

8. The scattering transflector according to claim 1, wherein the reflective material is a metallic material.

9. The scattering transflector according to claim 1, wherein the substrate of the transflector is selected from a group consisting of a polymer substrate and a glass substrate.

10. The scattering transflector according to claim 1, wherein two or more of the portions of the reflective material are electrically connected to one another.

11. The scattering transflector according to claim 1, further comprising a transparent, electrically conductive layer disposed over the undulating surface of the substrate.

12. The scattering transflector according to claim 11, wherein the portions of reflective material are disposed over the transparent, electrically conductive layer.

13. The scattering transflector according to claim 11, wherein two or more of the portions of the reflective material layer are electrically connected to one another by the transparent, electrically conductive layer.

14. The scattering transflector according to claim 12, wherein the two or more of the portions of the reflective material layer are electrically connected to one another by the transparent, electrically conductive layer.

15. The scattering transflector according to claim 1, wherein a portion of the substrate has a thickness of substantially zero.

16. The scattering transflector according to claim 1, wherein either the first or second portions of the undulating surface of the substrate are not flat.

17. The scattering transflector according to claim 16, wherein the first portions of the undulating surface of the substrate have a concave surface in section.

18. The scattering transflector according to claim 16, wherein the first portions of the undulating surface of the substrate have a concave surface in section and the second portions of the undulating surface of the substrate have a convex surface in section.

19. The scattering transflector according to claim 1, wherein the reflective material is disposed in strips along the first portions of the undulating surface of the substrate.

20. The scattering transflector according to claim 19, wherein the strips of reflective material disposed along the first portions of the undulating surface of the substrate have some degree of randomness, when seen in plan view.

21. The scattering transflector according to claim 20, wherein at least one edge of each strip of reflective material is irregular.

22. The scattering transflector according to claim 4, wherein the reflective material is disposed randomly on the first portions of the undulating surface of the substrate in discrete portions.

23. The scattering transflector according to claim 1, wherein the surface of the transflector comprises a plurality of discrete raised portions.

24. The scattering transflector according to claim 23, wherein the reflective material is disposed over part of at least some of the discrete raised portions.

25. The scattering transflector according to claim 24, wherein the locations of the discrete raised portions are randomly distributed.

26. A display device comprising an optical modulating element; and a scattering transflector, wherein the reflectivity of a surface of the transflector is dependent on the angle at which light is incident on the surface of the transflector, the transflector further comprising a substrate having an undulating surface, a plurality of first portions of the undulating surface being inclined in a first direction and a plurality of second portions of the undulating surface being inclined in a second direction different from the first direction and a reflective material disposed over selected parts of the undulating surface of the substrate;

wherein the reflective material is disposed over a greater area of first portions of the undulating surface than second portions of the undulating surface.

27. The display device according to 26, wherein in the transflector the reflective material is disposed over substantially all the first portions of the undulating surface of the substrate.

28. The display device according to claim 26, wherein in the transflector the reflective material is disposed over all the first portions of the undulating surf ace of the substrate.

29. The display device according to claim 26, wherein in the transflector the reflective material is disposed over substantially none of the second portions of the undulating surface of the substrate.

30. The display device according to claim 26, wherein in the transflector the reflective material is disposed over none of the second portions of the undulating surface of the substrate.

31. The display device according to claim 26, wherein in the transflector the average angle of inclination of each first portion of the undulating surface of the substrate is equal in magnitude and opposite in sign to the average angle of inclination of each second portion of the undulating surface of the substrate.

32. The display device according to claim 26, wherein in the transflector the average angle of inclination of each first portion of the undulating surface of the substrate is different in magnitude and opposite in sign to the average angle of inclination of each second portion of the undulating surface of the substrate.

33. The display device according to claim 26, wherein the reflective material of the transflector is a metallic material.

34. The display device according to claim 26, wherein the substrate of the transflector is selected from a group consisting of a polymer substrate and a glass substrate.

35. The display device according to claim 26, wherein two or more of the portions of the reflective material are electrically connected to one another.

36. The display device according to claim 26, further comprising a transparent, electrically conductive layer disposed over the undulating surface of the substrate.

37. The display device according to claim 36, wherein the portions of reflective material are disposed over the transparent, electrically conductive layer.

38. The display device according to claim 37, wherein two or more of the portions of the reflective material layer are electrically connected to one another by the transparent, electrically conductive layer.

39. The display device according to claim 38, wherein a portion of the substrate has a thickness of substantially zero.

40. The display device according to claim 26, wherein either the first or second portions of the undulating surface of the substrate are not flat.

41. The display device according to claim 40, wherein the first portions of the undulating surface of the substrate have a concave surface in section.

42. The display device according to claim 41, wherein the first portions of the undulating surface of the substrate of the substrate have a concave surface in section and the second portions of the undulating surface of the substrate have a convex surface in section.

43. The display device according to claim 26, wherein the reflective material is disposed in strips along the first portions of the undulating surface of the substrate.

44. The display device according to claim 43, wherein the strips of reflective material disposed along the first portions of the undulating surface of the substrate have some degree of randomness, when seen in plan view.

45. The display device according to claim 44, wherein at least one edge of each strip of reflective material is irregular.

46. The display device according to claim 29, wherein the reflective material is disposed randomly on the first portions of the undulating surface of the substrate in discrete portions.

47. The display device according to claim 26, wherein the surface of the transflector comprises a plurality of discrete raised portions.

48. The display device according to claim 47, wherein the reflective material is disposed over part of at least some of the discrete raised portions.

49. the display device according to claim 48, wherein the locations of the discrete raised portions are randomly distributed.

50. The display device according to claim 27, wherein at least one portion of the substrate has a thickness of substantially zero for for forming at least one transmissive window.

51. The display device according to claim 50, wherein the reflective material is not provided in the at least one transmissive window of the substrate.

52. The display device according to claim 51, wherein the optical modulating element comprises an electro-optic layer of a thickness so as to form a half wavelength retarder in the at least one transmissive window of the substrate and a quarter-wavelength retarder elsewhere.

53. The display device according to claim 26, wherein the transflector is disposed relative to the optical modulating element such that an angle between the normal to each first portion and the direction in which light is incident on the display surface of the display device is less than the angle between the normal to the display surface of the display device and the direction in which light is incident on the display surface.

54. The display device according to claim 26, wherein the transflector is disposed behind the optical modulating element.

55. The display device according to 26, wherein the transflector is disposed within the optical modulating element.

56. The display device according to claim 26, whereon the optical modulating element comprises an electro-optic layer disposed between a first substrate and a second substrate.

57. The display device according to claim 56, wherein the electro-optic layer is a liquid crystal layer.

58. The display device according to claim 56, wherein the substrate of the transflector is one of the substrates of the optical modulating element.

* * * * *